US012769069B2

(12) United States Patent
Choe et al.

(10) Patent No.: US 12,769,069 B2
(45) Date of Patent: Oct. 20, 2026

(54) OPTICAL ALIGNMENT DEVICE AND OPTICAL ALIGNMENT METHOD

(71) Applicant: ELECTRONICS AND TELECOMMUNICATIONS RESEARCH INSTITUTE, Daejeon (KR)

(72) Inventors: Joong-Seon Choe, Daejeon (KR); Kap-Joong Kim, Daejeon (KR); Dong Churl Kim, Daejeon (KR); Minchul Kim, Daejeon (KR); Ju Hee Baek, Daejeon (KR); Chun Ju Youn, Daejeon (KR); Kyongchun Lim, Daejeon (KR); Byung-seok Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 295 days.

(21) Appl. No.: 18/646,356

(22) Filed: Apr. 25, 2024

(65) Prior Publication Data

US 2025/0164710 A1 May 22, 2025

(30) Foreign Application Priority Data

Nov. 21, 2023 (KR) ........................ 10-2023-0161914

(51) Int. Cl.
*G02B 6/42* (2006.01)
*G01M 11/00* (2006.01)
(Continued)

(52) U.S. Cl.
CPC ......... *G02B 6/4226* (2013.01); *G02B 6/4225* (2013.01); *G02B 6/4227* (2013.01)

(58) Field of Classification Search
CPC .. G02B 6/4226; G02B 6/4225; G02B 6/4227; G02B 6/30; G02B 6/0006; G02B 7/005; G01M 11/30
See application file for complete search history.

(56) References Cited

U.S. PATENT DOCUMENTS 6,253,011 B1 * 6/2001 Haake .................. G02B 6/4226 385/52
6,594,426 B1 7/2003 Kwon et al.
(Continued)

FOREIGN PATENT DOCUMENTS

CN 108646353 A 10/2018
JP 6264797 B2 1/2018
(Continued)

*Primary Examiner* — Thomas A Hollweg
*Assistant Examiner* — Erin D Chiem

(57) ABSTRACT

Provided are an optical alignment device and an optical alignment method. The optical alignment device includes an input optical fiber, a light source provided at one terminal of the input optical fiber to generate input light, an input stage provided at another terminal of the input optical fiber, an output stage spaced apart from the input stage, a stage driving control unit configured to control driving of the input and output stages, a camera configured to receive output light generated from the input light by the waveguide chip and detect a waveguide mode, an output optical fiber having one terminal connected to the output stage, an optical power meter configured to detect an intensity of the output light, and a system controller configured to determine the waveguide mode and the intensity of the output light.

14 Claims, 9 Drawing Sheets

(51) Int. Cl.
*G02B 6/30* (2006.01)
*G02B 7/00* (2021.01)

(56) References Cited

U.S. PATENT DOCUMENTS

| | | | | |
|---|---|---|---|---|
| 8,615,149 | B2 * | 12/2013 | Kim | G02B 6/3885 385/92 |
| 10,459,177 | B2 * | 10/2019 | Kim | G02B 6/4227 |
| 2003/0231834 | A1 | 12/2003 | Massey et al. | |
| 2005/0115668 | A1 | 6/2005 | Lee et al. | |
| 2013/0033573 | A1 | 2/2013 | Park et al. | |
| 2018/0172983 | A1 | 6/2018 | Maeda | |
| 2021/0311268 | A1 * | 10/2021 | Fujii | G02B 6/4227 |
| 2023/0213703 | A1 * | 7/2023 | Nesic | G02B 6/272 385/24 |
| 2023/0243748 | A1 | 8/2023 | Kim | |

FOREIGN PATENT DOCUMENTS

| | | | |
|---|---|---|---|
| KR | 10-2000-0014723 | A | 3/2000 |
| KR | 10-2005-0051193 | A | 6/2005 |
| KR | 10-2005-0097694 | A | 10/2005 |
| KR | 10-0866034 | B1 | 10/2008 |
| KR | 10-2503802 | B1 | 2/2023 |

* cited by examiner

OPTICAL ALIGNMENT DEVICE AND OPTICAL ALIGNMENT METHOD

CROSS-REFERENCE TO RELATED APPLICATIONS

This U.S. non-provisional patent application claims priority under 35 U.S.C. § 119 of Korean Patent Application No. 10-2023-0161914, filed on Nov. 21, 2023, the entire contents of which are hereby incorporated by reference.

BACKGROUND

The present disclosure herein relates to an optical alignment device and an optical alignment method, and more particularly, to an optical alignment device and an optical alignment method using waveguide mode detection.

Typically, there is a kind of an optical element performing a function of receiving light from an external light source, processing the light in the optical element, and then outputting the light to the outside. For example, there is an optical element (an optical modulator, a variable optical attenuator, or the like) that receives an electrical signal through an electrode or the like to actively change the output characteristics, or a passive optical element (a beam splitter, an arrayed waveguide grating (AWG) or the like) for consistently performing functions defined as designed. In order to evaluate the characteristics of such an optical element or to align and fix input and output light to manufacture a module, it is required to preferentially align the input light. In particular, when light is input from the side, it may be difficult to find the position of a waveguide through direct observation through a microscope and move the input light.

SUMMARY

The present disclosure provides an optical alignment device and an optical alignment method thereof which may increase the alignment efficiency between a plurality of optical fibers.

An embodiment of the inventive concept provides an optical alignment device including an input optical fiber; a light source provided at one terminal of the input optical fiber and configured to generate input light; an input stage provided at another terminal of the input optical fiber and provided adjacent to one side of a waveguide chip; an output stage provided adjacent to another side of the waveguide chip and spaced apart from the input stage; a stage driving control unit connected to the input and output stages and configured to control driving of the input and output stages; a camera mounted on the output stage, and configured to receive output light generated from the input light by the waveguide chip and detect a waveguide mode; an output optical fiber provided adjacent to the camera, and having one terminal connected to the output stage; an optical power meter connected to another terminal of the output optical fiber and configured to receive the output light to detect an intensity of the output light; and a system controller connected to the optical power meter, the camera, and the stage control unit, and configured to determine the waveguide mode and the intensity of the output light.

In an embodiment, the system control unit may use machine-learning to determine whether the input optical fiber is aligned with the waveguide chip.

In an embodiment, the input stage may have a first optical fiber fixing jig configured to fix the other terminal of the input optical fiber.

In an embodiment, the output stage may have a second optical fiber fixing jig configured to fix the one terminal of the output optical fiber.

In an embodiment, the waveguide chip comprises an edge-coupled waveguide chip.

In an embodiment, the optical alignment device may further include a six polarization modes generation unit between the input optical fiber and the waveguide chip.

In an embodiment, the six polarization modes unit may include: a lens; a collimator between the lens and the input optical fiber; and quarter wavelength plate between the collimator and the lens.

In an embodiment, the six polarization modes generation unit may further include a linear polarization plate between the quarter wavelength plate and the collimator.

In an embodiment, the quarter wavelength plate may be rotated by azimuth angles of −45°, −22.5°, 0, 22.5°, or 45°.

In an embodiment, the quarter wavelength plate may be provided in an inner ring, an outer ring outside the inner ring, and are adjusted by the azimuth angles along notches of the inner ring.

In an embodiment of the inventive concept, an optical alignment method includes: providing a terminal of an input optical fiber in adjacent to a waveguide chip; providing input light to the waveguide chip through the input optical fiber; receiving output light output from the waveguide chip to acquire optical images; determining whether a waveguide mode is detected in the optical images; moving the terminal of the input optical fiber when the waveguide mode is not detected in the optical images; and repetitively performing the providing input light, the acquiring optical images, and determining whether a waveguide mode is detected until the waveguide mode is detected.

In an embodiment, the optical alignment method may further include stopping the movement of the terminal of the input optical fiber when the waveguide mode is detected.

In an embodiment, the optical alignment method may further include providing a terminal of an output optical fiber at a position of a camera when the waveguide mode is detected.

In an embodiment, the optical alignment method may further include moving the terminal of an output optical fiber two-dimensionally to acquire a position of maximum optical output power.

In an embodiment, the optical alignment method may further include moving the terminal of an input optical fiber two-dimensionally to acquire a position of maximum optical output power.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
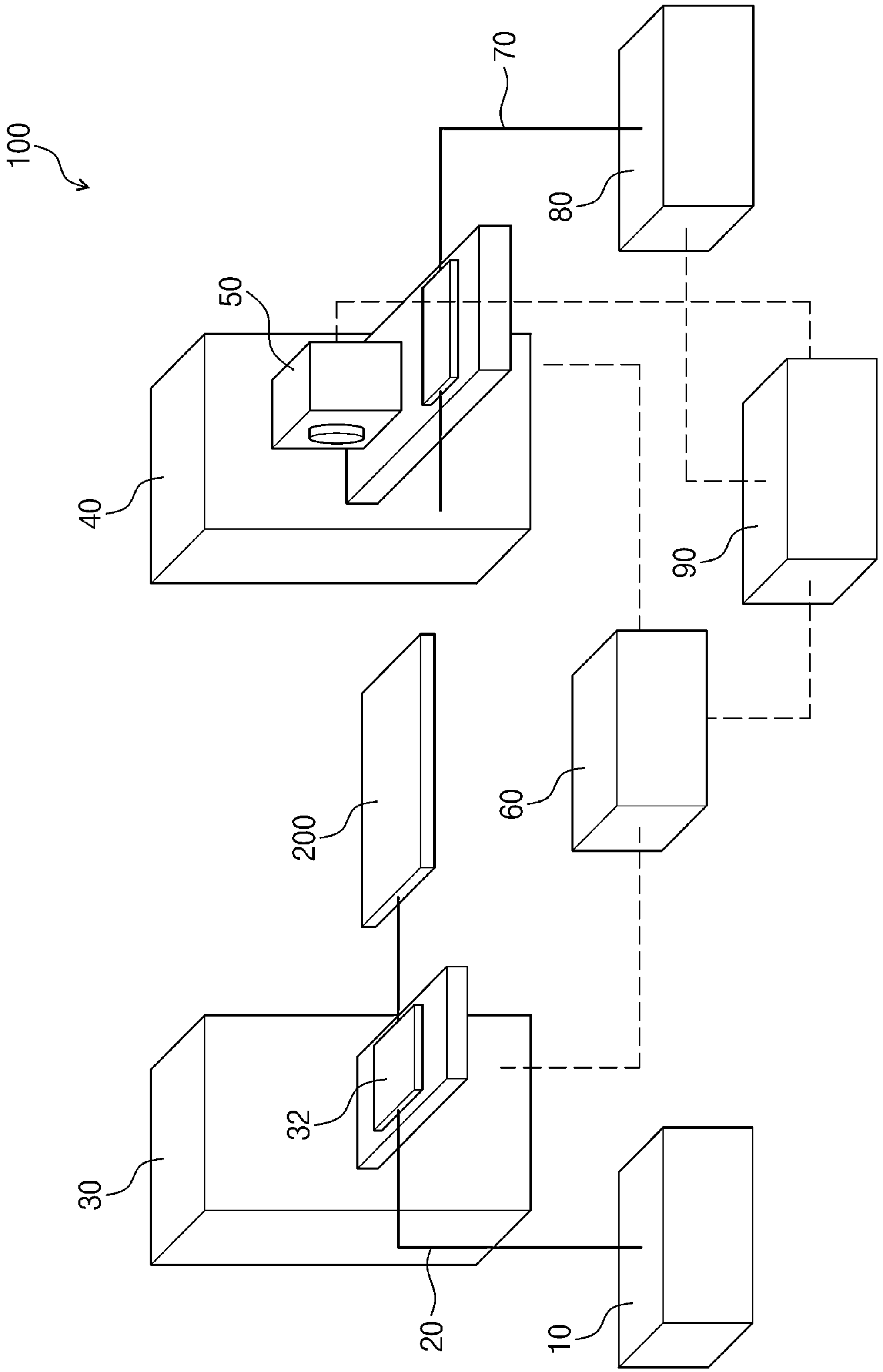
FIG. 1 is a block diagram showing an example optical alignment device according to the inventive concept.

Hereinafter, exemplary embodiments of the present disclosure will be described in conjunction with the accompanying drawings. The above and other aspects, features, and advantages of the present disclosure will become apparent from the detailed description of the following embodiments in conjunction with the accompanying drawings. However, it should be understood that the present invention is not limited to the following embodiments and may be embodied in different ways. Rather, the embodiments are provided so that so that this disclosure will be thorough and complete and will fully convey the concept of the invention to those skilled in the art, and the present disclosure will only be defined by the appended claims. Throughout this specification, like numerals refer to like elements.

The terminology used herein is for the purpose of describing particular embodiments only and is not intended to limit the scope of the present disclosure. As used herein, the singular forms “a”, “an” and “the” are intended to include the plural forms as well, unless the context clearly indicates otherwise. It will be further understood that the terms “comprises,” “comprising,” “includes” and/or “including,” when used herein, specify the presence of stated features, integers, steps, operations, elements, and/or components, but do not preclude the presence or addition of one or more other features, integers, steps, operations, elements, components, and/or groups thereof. Also, as just exemplary embodiments, reference numerals shown according to an order of description are not limited to the order.

Moreover, exemplary embodiments will be described herein with reference to cross-sectional views and/or plane views that are idealized exemplary illustrations. In the drawings, the thickness of layers and regions are exaggerated for effective description of the technical details. Accordingly, variations from the shapes of the illustrations as a result, for example, of manufacturing techniques and/or tolerances, are to be expected. Thus, exemplary embodiments should not be construed as limited to specific shapes illustrated herein but are to include deviations in shapes that result from manufacturing.

FIG. 1 shows an example optical alignment device 100 according to the inventive concept.

Referring to FIG. 1, the optical alignment device 100 of the inventive concept may include a light source 10, an input optical fiber 20, an input stage 30, an output stage 40, a camera 50, a stage driving control unit 60, an output optical fiber 70, an optical power meter 80, and a system control unit 90.

The light source 10 may generate input light. The input light may include visible light. Unlike this, the input light may include ultraviolet light or infrared light, and the inventive concept is not limited thereto.

The input optical fiber 20 may be connected to the light source 10. The input optical fiber 20 may deliver the input light to a waveguide chip 200. The input optical fiber 20 may include a single mode optical fiber.

The input stage 30 may be provided to another terminal of the input optical fiber 20 facing the light source 10. The input stage 30 may include a first optical fiber fixing jig 32 configured to fix the other terminal of the input optical fiber 20. The first optical fiber fixing jig 32 may move the other terminal of the input optical fiber 20 two-dimensionally or three-dimensionally with respect to the waveguide chip 200. The input stage 30 may be provided to one side of the waveguide chip 200. The waveguide chip 200 may receive the input light to generate output light. The waveguide chip 200 may include a silica waveguide chip.

The output stage 40 may be provided to the other side of the waveguide chip 200 facing the input stage 30. The output stage 40 may have a second optical fiber fixing jig 42. The second optical fiber fixing jig 42 may fix a terminal of the output optical fiber 7. The second optical fiber fixing jig 42 may move the terminal of the output optical fiber 70 two-dimensionally or three-dimensionally with respect to the waveguide chip 200.

The camera 50 may be provided adjacent to the second optical fiber fixing jig 42 on the output stage 40. The camera 50 may receive the output light to generate an optical image. The camera 50 may include a charge-coupled device or a CMOS image sensor.

The stage driving control unit 60 may be connected to the input stage 30 and the output stage 40. The stage driving control unit 60 may control the movements of the terminals of the input optical fiber 20 and the output optical fiber 70 on the input stage 30 and the output stage 40. The stage driving control unit 60 may include a power supply unit. The terminals of the input optical fiber 20 and the output optical fiber 70 may be moved based on a time table or a waveguide mode in the optical image.

The output optical fiber 70 may be connected between the output stage 40 and the optical power meter 80. When one terminal of the output optical fiber 70 is provided at the position of the camera 50, the output optical fiber 70 may receive and deliver the output light to the optical power meter 80. The output optical fiber 70 may include a single mode optical fiber.

The optical power meter 80 may be connected to the other terminal of the output optical fiber 70 facing the output stage 40. The optical power meter 80 may detect the intensity of the output light.

The system control unit 90 may be connected to the camera 50, the stage driving control unit 60, and the optical power meter 80. The system control unit 90 may acquire the optical image, and detect the waveguide mode in the optical image using a machine-learning method. The system control unit 90 may control the power output from the stage driving control unit 60. The system control unit 90 may determine the intensity of the output light. The system control unit 90 may include a personal computer, or a server.

Therefore, the optical alignment device 100 of the inventive concept may increase the alignment efficiency between the input optical fiber 20 and the output optical fiber 70 using the system control unit 90 that determines the waveguide mode in the optical image.

The optical alignment method of the optical alignment device 100, constituted like this, according to the inventive concept will be described below.

Figure 2:
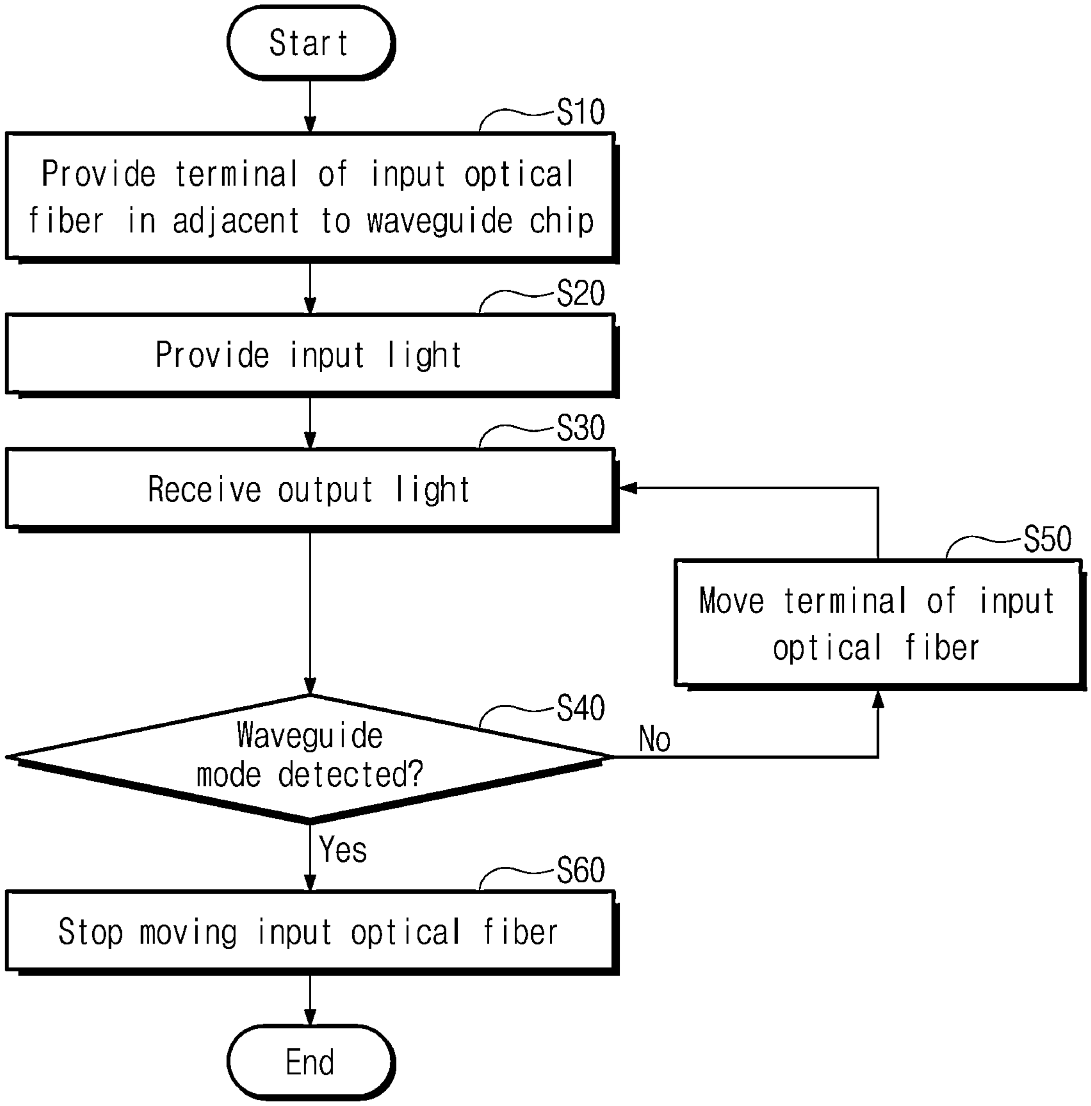
FIG. 2 is a flowchart showing an example optical alignment method according to the inventive concept.

FIG. 2 shows an example optical alignment method according to the inventive concept.

Referring to FIGS. 1 and 2, the other terminal of the input optical fiber 20 may be provided adjacent to the waveguide chip 200 (step S10). The other terminal of the input optical fiber 20 may be provided adjacent to the waveguide chip 200 by the first optical fiber fixing jig 32 of the input stage 30.

Then, the light source 10 may provide the input light to the input optical fiber 20 and the waveguide chip 200 (step S20). The waveguide chip 200 may receive the input light to generate the output light.

Then, the camera 50 may receive the output light from the waveguide chip 200 to detect the optical image (step S30). When the other terminal of the input optical fiber 20 is moved to the waveguide chip 200, the camera 50 may sequentially acquire a plurality of optical images. The optical images may include color images or grayscale images.

Thereafter, the system control unit 90 determines whether the waveguide mode is detected in the optical image (step S40).

When the waveguide mode is not detected in the optical image, the stage driving control unit 60 moves the terminal of the input optical fiber 20 (step S50).

The system control unit 90 may repetitively perform steps S30, S40, and S50 until the waveguide mode is detected in the optical image.

When the waveguide mode is detected in the optical image, the input stage 30 stops the movement of the terminal of the input optical fiber 20 (step S60).

Figure 3:
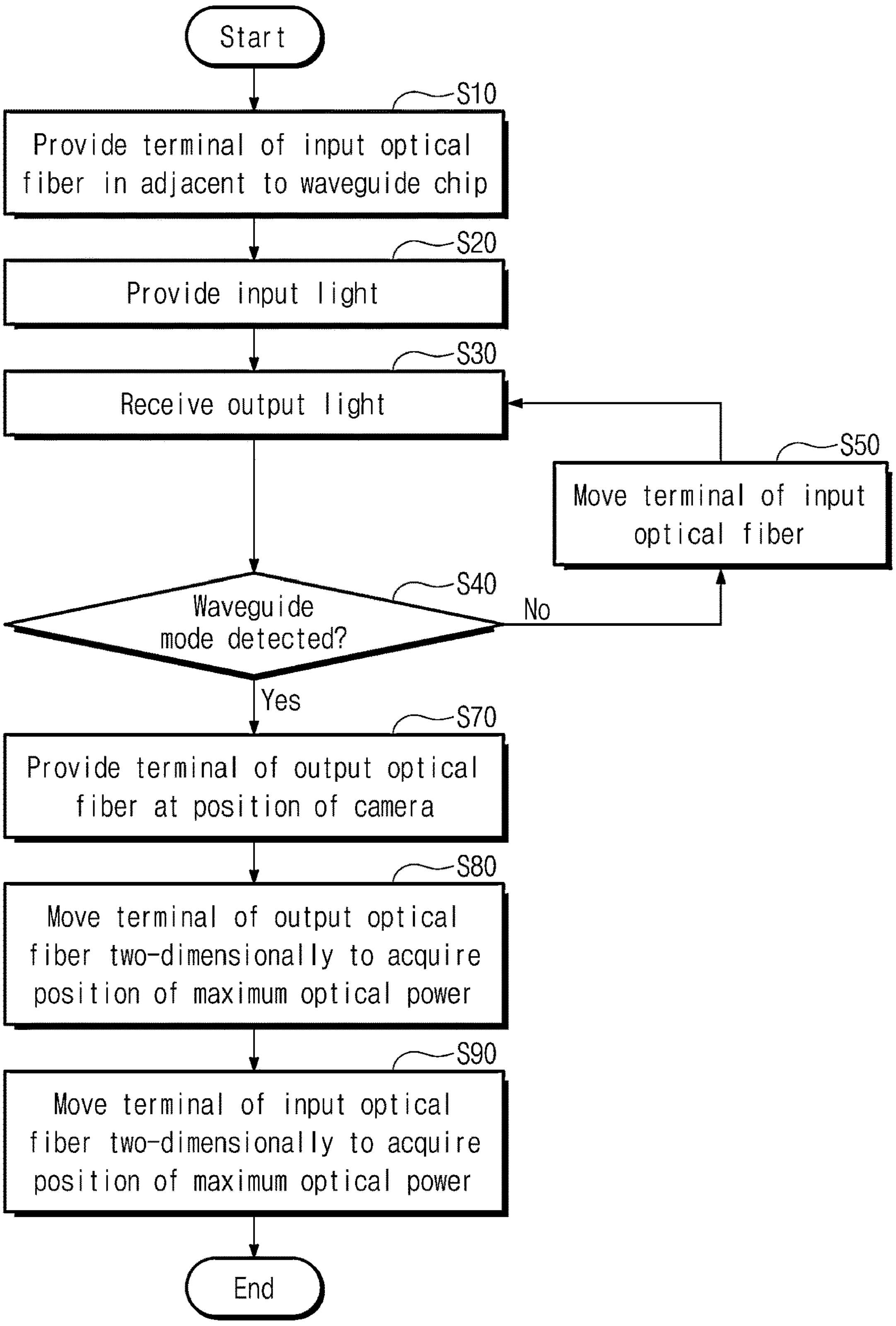
FIG. 3 is a flowchart showing another example optical alignment method according to an embodiment of the inventive concept.
Figure 4:
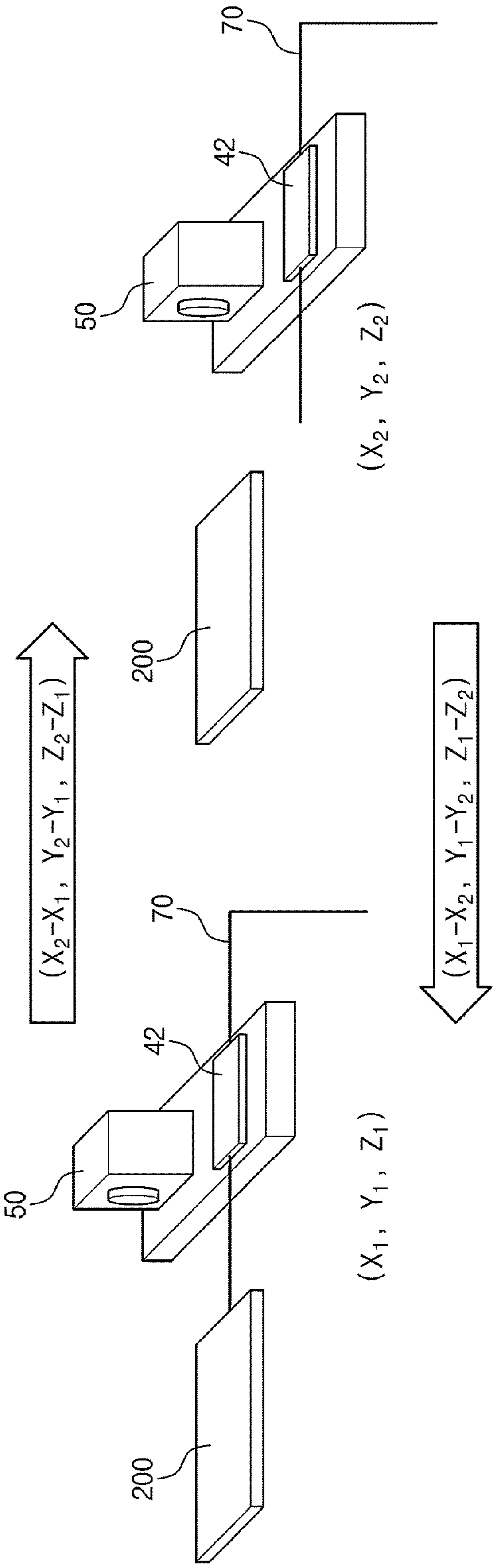
FIG. 4 is a drawing showing a position change of a camera and an output optical fiber in FIG. 1.

FIG. 3 shows another example optical alignment method according to the inventive concept. FIG. 4 shows a position change of the camera 50 and the output optical fiber 70 in FIG. 1. Steps S10 and S50 may be configured as same as FIG. 2.

Referring to FIGS. 3 and 4, when the waveguide mode is detected in the optical image, the stage driving control unit 60 may provide the terminal of the output optical fiber 70 at the position of the camera 50. When the position of the camera 50 is provided at coordinates (x2, y2, z2) and the position of the terminal of the output optical fiber 70 is provided at coordinates (x1, y1, z1), the terminal of the output optical fiber 70 may be moved by the distance of (x2−x1, y2−y1, z2−z1).

Referring to FIGS. 1 and 3, the stage driving control unit 60 and the system control unit 90 may move the terminal of the output optical fiber 70 two-dimensionally to acquire the position of the maximum light output (step S80). The stage driving control unit 60 and the system control unit 90 may move the terminal of the output optical fiber 70 to perform scanning so as to acquire the optical image. The terminal of the output fiber 70 may be moved in a clockwise, counterclockwise, or spiral direction.

In addition, the stage driving control unit 60 and the system control unit 90 may move the terminal of the output optical fiber 20 two-dimensionally to acquire the position of the maximum light output (step S90).

Figure 5:
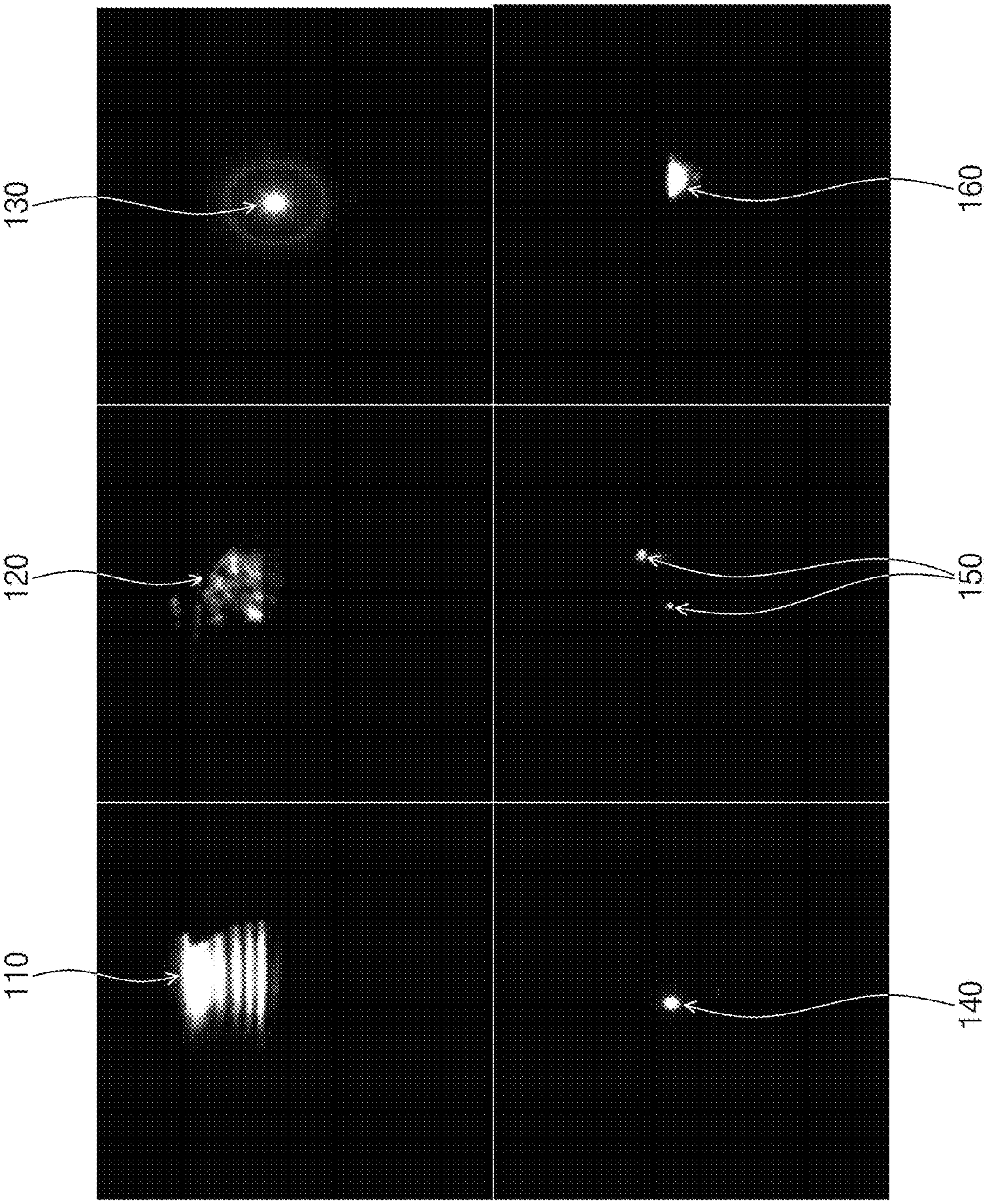
FIG. 5 is image photos showing example optical images acquired by the camera and a system control unit in FIG. 1.

FIG. 5 is example optical images acquired by the camera 50 and the system control unit 90 in FIG. 1.

Referring to FIG. 5, the system control unit 90 may acquire the optical images including a stripe pattern image 110, a first scattered light image 120, a first guided mode image 130, a second guided mode image 140, a second scattered light image 150, or a silicon guided optical image 160. The system control unit 90 may train or manage the optical images by means of machine learning. In addition, the system control unit 90 may store the optical images in a database.

Figure 6:
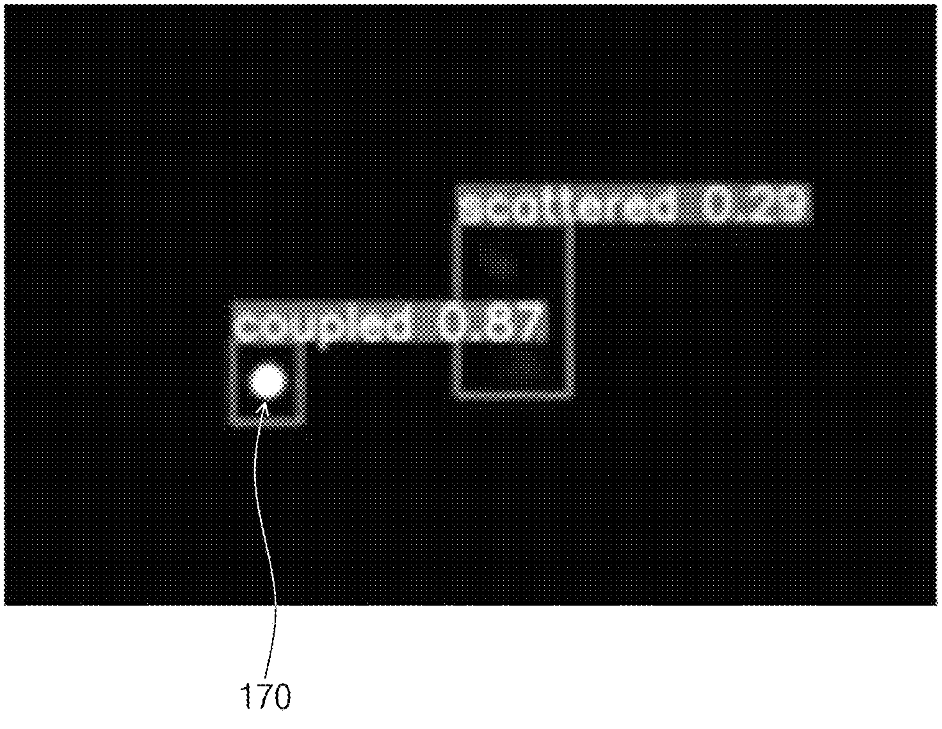
FIG. 6 is image photos showing a third guided mode image and a unique model name thereof in the optical image acquired by the camera and the system control unit in FIG. 1.

FIG. 6 shows a third guided mode image 170 and a unique model name thereof in the optical images acquired by the camera 50 and the system control unit 90 in FIG. 1.

Referring to FIG. 6, the system control unit 90 may acquire the optical images having the third waveguide mode image 170 and designate the third waveguide mode image 170 as coupled 0.87. The system control unit 90 may store the third waveguide mode image 170 in the database, and acquire and store the respective positions of the input optical fiber 20, the camera 50, and the output optical fiber 70 from which the third waveguide mode image 170 is detected.

Figure 7:
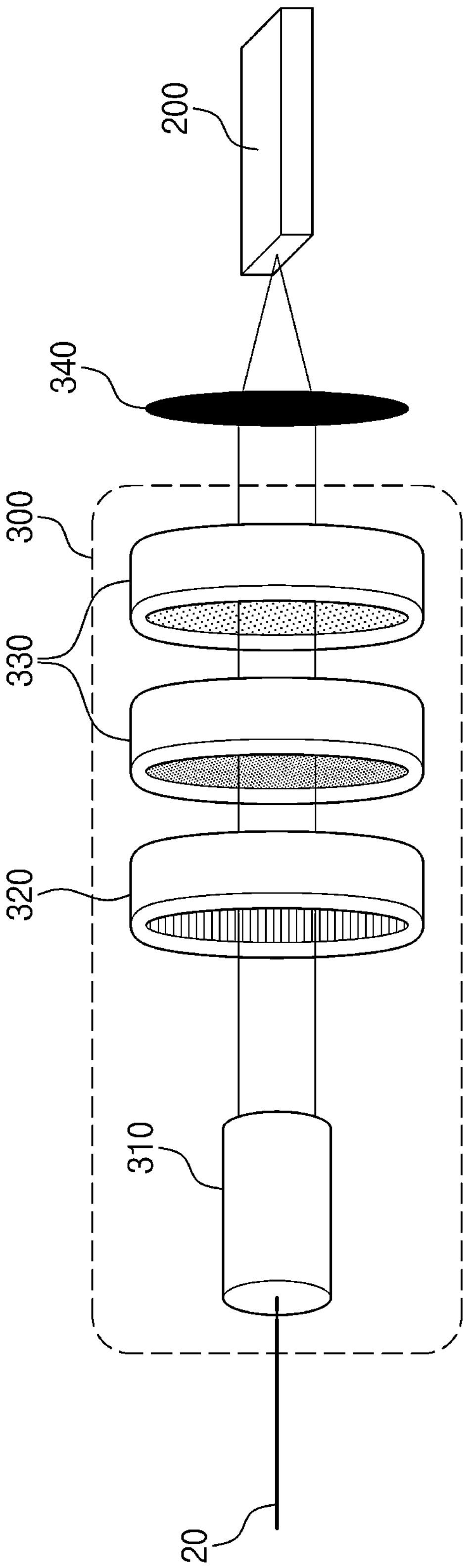
FIG. 7 is a cross-sectional view showing an example six polarization modes light generation unit between an input optical fiber and a waveguide chip in FIG. 1.

FIG. 7 is an example six polarization modes light beam generation unit 300 between the input optical fiber 20 and the waveguide chip 200 in FIG. 1.

Referring to FIG. 7, the optical alignment device 100 may further include the six polarization modes generation unit 300 between the input optical fiber 20 and the waveguide chip 200. The six polarization modes generation unit 300 may set a Stokes vector on a Poincare sphere. The six polarization modes generation unit 300 may accurately generate six polarization modes including horizontal polarization, vertical polarization, diagonal polarization, anti-diagonal polarization, right-handed circular polarization, or left-handed circular polarization, and input them to the waveguide chip 200.

According to an example, the six polarization modes generation unit 300 may include a collimator 310, a linear polarization plate 320, quarter wavelength plate 330, and a lens 340.

The collimator 310 may be provided to the terminal of the input optical fiber 20. The linear polarization plate 320 may be provided between the collimator 310 and the waveguide chip 200. The quarter wavelength plate 330 may be provided between the linear polarization plate 320 and the waveguide chip 200. The lens 340 may be provided between the quarter wavelength plate 330 and the waveguide chip 200. When horizontal polarization enters a first quarter wavelength plate through the linear polarization plate or a polarization maintaining optical fiber, the six polarization modes may be generated by an angle combination of the quarter wavelength plate like Table 1.

TABLE 1

| Final polarization | Angle (degree) of quarter wavelength plate 1 | Angle (degree) of quarter wavelength plate 2 |
|---|---|---|
| Horizontal | 0 | 0 |
| Vertical | 45 | 45 |
| Diagonal | 22.5 | 22.5 |
| Anti-diagonal | −22.5 | −22.5 |
| Right-handed circular | 0 | 45 |
| Left-handed circular | 0 | −45 |

Figure 8:
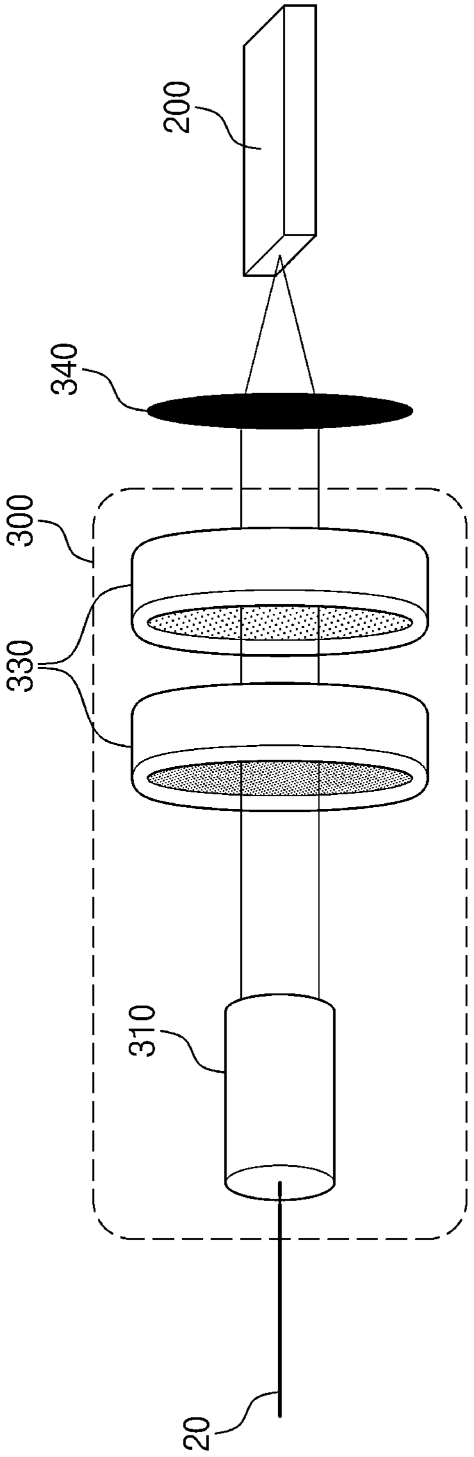
FIG. 8 is a cross-sectional view showing another example six polarization modes light generation unit between the input optical fiber and the waveguide chip in FIG. 1.

Examining the characteristics of the six polarization modes does not require to use a combination of quarter wavelength plate-half wavelength plate-quarter wavelength plate, which is used for generating an arbitrary polarization and requires three angle adjustments, but may be implemented by a control of two angles as described above. The control of two angles may not only reduce the number of optical components, but also further reduce the number of angle combinations, which results simple operations and reduction in time. FIG. 8 shows an example six polarization modes light generation unit 300 between the input optical fiber 20 and the waveguide chip 200 in FIG. 1.

Referring to FIG. 8, the linear polarization plate 320 of the six polarization modes generation unit 300 in FIG. 7 may be removed or omitted. The collimator 310, the quarter wavelength plate 330, and the lens 340 of the six polarization modes generation unit 300 may be configured identically to FIG. 7.

Figure 9:
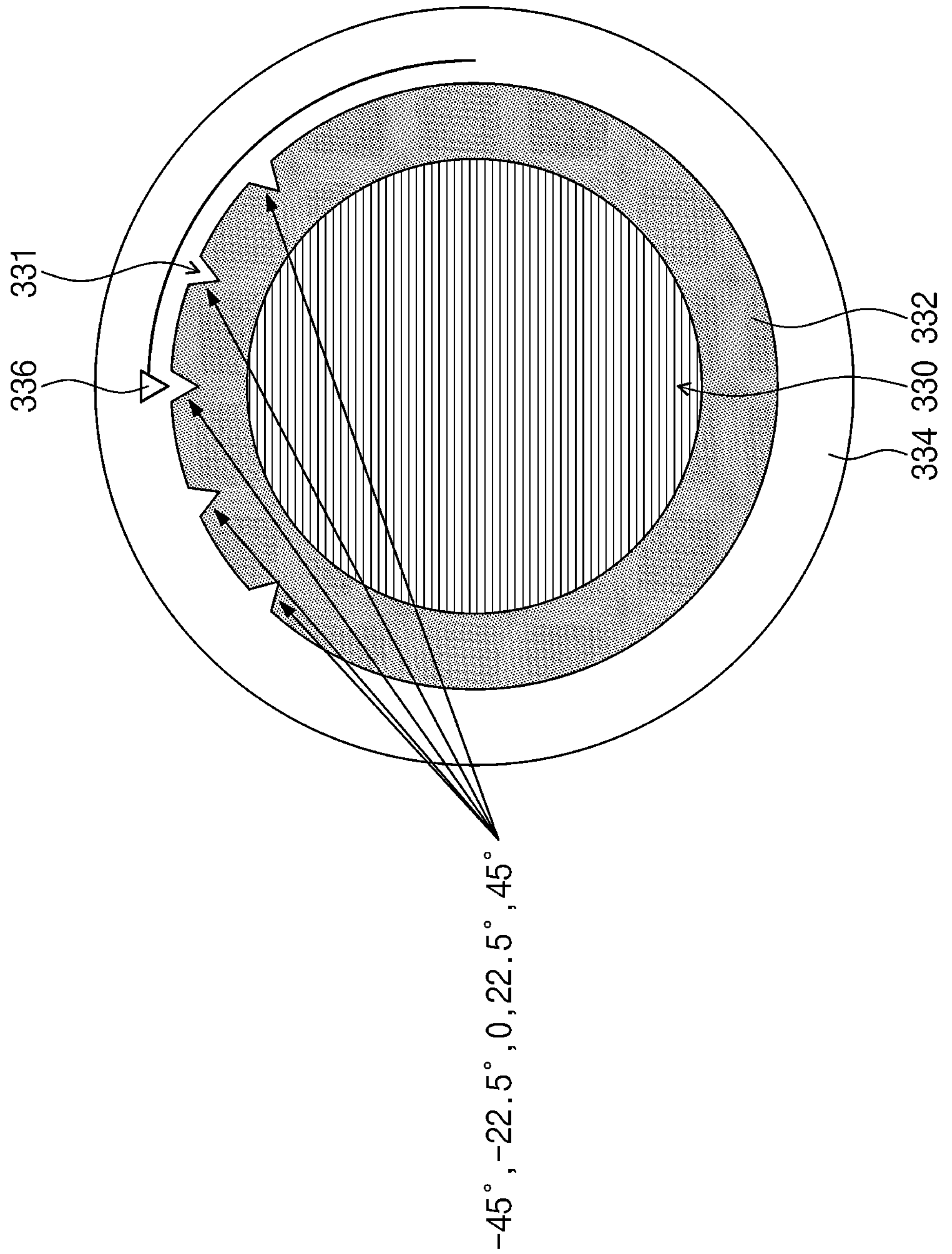
FIG. 9 shows an inner ring, an outer ring, and a rotation holder in the quarter-wavelength plate in FIGS. 7 and 8.

FIG. 9 shows the inner ring 332, the outer ring 334, and the rotation holder 336 in the quarter-wavelength plates 330 in FIGS. 7 and 8.

Referring to FIG. 9, the azimuth angles of the quarter wavelength plate 330 may be adjusted by the inner ring 332, the outer ring 334, and the rotation holder 336. The quarter wavelength plate 330 may be rotated by azimuth angles of −45°, −22.5°, 0, 22.5°, or 45° based on Table 1. The inner ring 332 may have five notches 331 corresponding to the azimuth angles of the quarter wavelength plate 330. The rotation holder 335 may be engaged in the notches 331. The quarter wavelength plate 330 may generate 6 polarizations for a quantum key distribution.

In the procedure for inputting light to the input unit of the waveguide chip through the lens as described above, the input unit is aligned by observing the output light through scanning with the camera and by stopping the procedure when the shape of the waveguide mode is observed. Here, the mode observed by the camera may vary according to the polarization of the input light through a chip function. For example, a polarization splitter may allow the horizontal polarization and the vertical polarization to be output to different waveguides. A six polarization modes splitter chip for the quantum key distribution serves for distributing the six input polarizations at predetermined ratios, and Table 2 is an example thereof. Table 2 shows power ratios of six outputs for each input polarization of an ideal polarization splitter chip for the quantum key distribution.

TABLE 2

| Input polarization | Output 1 | Output 2 | Output 3 | Output 4 | Output 5 | Output 6 |
|---|---|---|---|---|---|---|
| Horizontal | 1 | 0 | ¼ | ¼ | ¼ | ¼ |
| Vertical | 0 | 1 | ¼ | ¼ | ¼ | ¼ |
| Diagonal | ½ | ½ | ½ | 0 | ¼ | ¼ |
| Anti-diagonal | ½ | ½ | 0 | ½ | ¼ | ¼ |
| Right-handed circular | ½ | ½ | ¼ | ¼ | ½ | 0 |
| Left-handed circular | ½ | ½ | ¼ | ¼ | 0 | ½ |

In a characteristic measurement of the polarization splitter chip, it is important to measure the power ratio for each output of the plurality of output waveguides. In addition, the output power ratios in the configuration of the inventive concept are not measured by an optical power meter by combining actual optical fibers, but may be obtained by means of a two-dimensional histogram of the output light of each of the waveguides, which is recognized through the camera, and the actual characteristics of the polarization splitter chip may be evaluated therefrom. In other words, the characteristics of the polarization splitter chip may be analyzed without contacting the optical fibers which can prevent contamination or damage of the chip and reduce the measurement time. A surface optical coupling element has significant advantages in comparison to a side surface optical coupling element which has the most inefficient point in that a chip is cut from a wafer and then the characteristics of the chip are measured.

As described above, the optical alignment device according to the embodiments of the present disclosure may increase the alignment efficiency between the plurality of optical fibers using the system control unit configured to determine the waveguide mode in the optical images.

The example embodiments of the present disclosure have been described above with reference to the accompanying drawings, but those skilled in the art will understand that the present disclosure may be implemented in another concrete form without changing the technical spirit or an essential feature thereof. Therefore, the aforementioned exemplary embodiments are all illustrative and are not restricted to a limited form.

What is claimed is:

1. An optical alignment device comprising:

an input optical fiber;

a light source provided at one terminal of the input optical fiber and configured to generate input light;

an input stage provided at another terminal of the input optical fiber and provided adjacent to one side of a waveguide chip;

an output stage provided adjacent to another side of the waveguide chip and spaced apart from the input stage;

a stage driving control unit connected to the input and output stages and configured to control driving of the input and output stages;

a camera mounted on the output stage, and configured to receive output light generated from the input light by the waveguide chip and detect a waveguide mode;

an output optical fiber provided adjacent to the camera, and having one terminal connected to the output stage;

an optical power meter connected to another terminal of the output optical fiber and configured to receive the output light to detect an intensity of the output light;

a system controller connected to the optical power meter, the camera, and the stage driving control unit, and configured to determine the waveguide mode and the intensity of the output light; and a six polarization modes generation unit between the input optical fiber and the waveguide chip.

2. The optical alignment device according to claim 1, wherein the system control unit uses machine-learning to determine whether the input optical fiber is aligned with the waveguide chip.

3. The optical alignment device according to claim 1, wherein the input stage has a first optical fiber fixing jig configured to fix the other terminal of the input optical fiber.

4. The optical alignment device according to claim 1, wherein the output stage has a second optical fiber fixing jig configured to fix the one terminal of the output optical fiber.

5. The optical alignment device according to claim 1, wherein the waveguide chip comprises an edge-coupled waveguide chip.

6. The optical alignment device according to claim 1, wherein the six polarization modes generation unit comprises:

a lens;

a collimator between the lens and the input optical fiber; and a quarter wavelength plate between the collimator and the lens.

7. The optical alignment device according to claim 6, wherein the six polarization modes generation unit further comprises a linear polarization plate between the quarter wavelength plate and the collimator.

8. The optical alignment device according to claim 6, wherein the quarter wavelength plate are rotated by azimuth angles of −45°, −22.5°, 0, 22.5°, or 45°.

9. The optical alignment device according to claim 8, wherein the quarter wavelength plate are provided in an inner ring, an outer ring outside the inner ring, and are adjusted by the azimuth angles along notches of the inner ring.

10. An optical alignment method comprising:

providing a terminal of an input optical fiber in adjacent to a waveguide chip;

providing a six polarization modes generation unit between the terminal of the input optical fiber and the waveguide chip;

providing input light to the waveguide chip through the input optical fiber;

receiving output light output from the waveguide chip to acquire optical images;

determining whether a waveguide mode is detected in the optical images;

moving the terminal of the input optical fiber when the waveguide mode is not detected in the optical images; and repetitively performing the providing input light, the acquiring optical images, and determining whether a waveguide mode is detected until the waveguide mode is detected.

11. The optical alignment method according to claim 10, further comprising:

stopping the movement of the terminal of the input optical fiber when the waveguide mode is detected.

12. The optical alignment method according to claim 10, further comprising:

providing a terminal of an output optical fiber at a position of a camera when the waveguide mode is detected.

13. The optical alignment method according to claim 12, further comprising:

moving the terminal of an output optical fiber two-dimensionally to acquire a position of maximum optical output power.

14. The optical alignment method according to claim 13, further comprising:

moving the terminal of an input optical fiber two-dimensionally to acquire a position of maximum optical output power.

* * * * *